United States Patent
Jonsson

(12) 
(10) Patent No.: US 6,208,856 B1
(45) Date of Patent: Mar. 27, 2001

(54) METHOD FOR MAINTAINING SERVICE NODES IN A TELECOMMUNICATIONS NETWORK

(75) Inventor: Björn Erik Rotger Jonsson, Järfälla (SE)

(73) Assignee: Telefonaktiebolaget L M Ericsson, Stockholm (SE)

( * ) Notice: Subject to any disclaimer, the term of this patent is extended or adjusted under 35 U.S.C. 154(b) by 0 days.

(21) Appl. No.: 08/986,437

(22) Filed: Dec. 8, 1997

(51) Int. Cl.[7] ....................................................... H04Q 7/24
(52) U.S. Cl. ........................ 455/424; 455/433; 455/445; 370/221; 379/279
(58) Field of Search ................................. 455/423, 424, 455/445, 446, 8, 67.1, 433; 379/279, 207, 221, 229; 370/216–228, 241–245, 237, 238, 351–353; 709/223, 224

(56) References Cited

U.S. PATENT DOCUMENTS

| 4,811,388 | 3/1989 | Westerhof et al. . |
| 5,297,193 | 3/1994 | Bouix et al. . |
| 5,623,532 | 4/1997 | Houde et al. . |
| 5,625,866 | * 4/1997 | Lidbrink et al. ........................ 455/8 |

FOREIGN PATENT DOCUMENTS

| 100410 | 6/1998 | (EP) . |
| WO 94/30027 | 12/1994 | (WO) . |
| WO 95/15635 | 6/1995 | (WO) . |

OTHER PUBLICATIONS

*Service Assurance in Modern Telecommunications Networks* by Warren E. Falconer, XP 000175001; IEEE Communications Magazine, vol. 28, No. 6, Jun. 1, 1990, pp. 32–39.

*Contingency Process for SS7 Network Failures* by Jerzy W. Miernik, Doug MacDonald and John Yuristy, XP 000337636; Proceedings of the International Switching Symposium, Yokohama, Oct. 25–30, 1992 Institute of Electronics; Information and Communication Engineers, vol. 1, No. SYMP. 14, Oct. 25, 1992, pp. 164–168.

*Network Management Systems for Availability and Survivability* by Balaji C.V. Ramarao, Network Management Systems Planning and Development, Sprint Long Distance Division, Annual Review of Communications, XP 000455355; vol. 47, Jan. 1, 1993, pp. 402–410.

*Customer Control of Centrex Service* by E.J. Pasternak and S.A. Schulman, International Switching Symposium 1987, XP 002065749; vol. 1, Mar. 15–20, 1987, pp. 154–159.

*An End User's Expectations of the Advanced Intelligent Network* by Ed Bonkowski, Annual Review of Communications, XP 000321961; vol. 46, Jan. 1, 1992, pp. 491–495.

(List continued on next page.)

*Primary Examiner*—Reinhard Eisenzopf
*Assistant Examiner*—Lester G Kincaid
(74) *Attorney, Agent, or Firm*—Jenkens & Gilchrist

(57) ABSTRACT

A method for achieving operational reliability in an overlayed network of service nodes is disclosed. The overlayed network of service nodes is connected to a public telecommunications network. In response to a party using a subscriber number to make a call, the public telecommunications network routes the call to a preferred service node. The preferred service node is capable of providing a plurality of services in response to such a call. If the preferred service node experiences a failure or is otherwise not operational, and does not respond to such a call, the public telecommunications network reroutes the call to a standby service node, which provides the same services as the preferred service node.

37 Claims, 1 Drawing Sheet

OTHER PUBLICATIONS

*Customer Network Reconfiguration Applications Utilizing Digital Cross–Connect Systems* by Pamela J. Zanella, XP 000042158; Communications for the Information Age, Hollywood, Nov. 28–Dec. 1, 1988 vol. 3, No. 28, Nov. 1988, Institute of Electrical and Electronics Engineers, pp. 1538–1543.

*A Distributed Architecture for Customer Network Control* by S.E. Aidarious, T. Ball, R. Tam and D. Biggs, XP 000014498; Digital Technology—Spanning the Universe, Philadelphia, Jun. 12–15, 1988 vol. 2, Jun. 12, 1988, Institute of Electrical And Electronics Engineers, pp. 1148–1153.

*Design and Deployment of an Integrated Network Management System for a Large Telco Network* by Willis Stinson, Shaygan Kheradpir and Fariborz Ebrahimi, XP000452397; Proceedings of the Network Operations and Management Symposium, Feb. 14–17, 1994, pp. 36–48.

* cited by examiner

METHOD FOR MAINTAINING SERVICE NODES IN A TELECOMMUNICATIONS NETWORK

BACKGROUND OF THE INVENTION

1. Technical Field of the Invention

The present invention relates in general to the telecommunications field and, in particular, to a method for maintaining the reliable operation of a distributed network of service nodes overlaying a telecommunications network.

2. Description of Related Art

A basic customer requirement that operators of telecommunications networks must meet is that the networks operate reliably. In particular, the network requirements imposed on basic switching functions and basic subscriber services are extremely high. When more advanced services are introduced into the conventional networks, they usually adhere to the same high operational requirements even if the new advanced services are not as important or critical as the basic services already being provided.

Increased deregulation and competition have caused a recent trend in the telecommunications field, wherein new service providers are basing their advanced services on the existing infrastructures of basic switching functions and subscriber services being provided by the conventional network operators. Consequently, overlayed networks of service nodes are being created, which are characterized as generic equipment provided by a plurality of suppliers. Recently, a great deal of resources have been expended to investigate the functionality of such overlay networks. However, much less attention has been paid to their reliability.

A common practice in conventional telecommunications systems using stored program control is to utilize redundant resources as the basis for a maintenance subsystem. In particular, central processors are duplicated and operated in synchronism so that fault detection can be accomplished by comparison methods. One such method uses software analysis programs to determine if a processor is faulty, so the faultless processor can be used to take over the load. A characteristic of this method is that the process of switching control over to one of the two processors affects all of the data needed for a communication path. In other words, the control system (or switching control system or processor control system) is potentially capable of handling any new call setup request while the faulty processor is being repaired. By multiplying the switching resources in a telecommunications network, the maintenance subsystem can block the use of a faulty resource, but a plurality of identical resources will still remain available so that the effect of the faulty resource on the communications traffic will be negligible. Consequently, using redundancy methods, an extremely high degree of security can be achieved in conventional telecommunications systems that provide basic switching functions and subscriber services.

However, the recent introduction of advanced telecommunications services provided by distributed computers has raised a number of questions related to operational reliability. One distributed network architecture that is being used to introduce these advanced services is known as Intelligent Networks (IN). An IN architecture is typically characterized by its relationship with an existing underlying network, whereby the IN hardware and software are closely integrated with the existing underlying network, and one operator controls the operation and maintenance of the complete network including the IN extensions. Consequently, it is a common practice to use the same methods for maintaining a reliable operation throughout the extended network including the IN nodes.

A problem with the solutions used by operators of the conventional telecommunications networks in attempting to achieve very high system availability is that these solutions are complex and costly. Furthermore, an independent service provider may not have access to all of the capabilities required from a telecommunications network. Even though it is sometimes argued that a lower degree of reliability may be acceptable regarding the new services provided through overlayed networks, it is clear that system reliability will still be an important and competitive factor. As described below, a problem that the present invention resolves is how to design a method that is easy to implement in emerging service networks overlayed on conventional networks, which provides a high degree of security at a low cost. The present invention achieves this goal partly by relying on the very high degree of security of the basic services provided by the underlying network.

SUMMARY OF THE INVENTION

It is, therefore, an object of the present invention to increase the reliability and security of an overlayed service network.

It is another object of the present invention to increase the reliability of an overlayed network of service nodes without the need for a complex and costly system.

It is yet another object of the present invention to increase the reliability and security of an overlayed network of service nodes by utilizing the basic service(s) offered by the underlying public network.

It is a further object of the present invention to reduce any additional workload imposed on a standby service node by distributing the workload over a plurality of service nodes.

In accordance with the present invention, the foregoing and other objects are achieved by a method for achieving operational reliability in an overlayed network of service nodes, which is connected to a public telecommunications network. In response to a party using a subscriber number to make a call, the public telecommunications network routes the call to a preferred service node in the overlayed network. The preferred service node is capable of providing a plurality of services in response to such a call. If the preferred service node experiences a failure or is otherwise not operational, and does not respond to such a call, the public telecommunications network reroutes the call to a standby service node, which provides the same services as the preferred service node.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
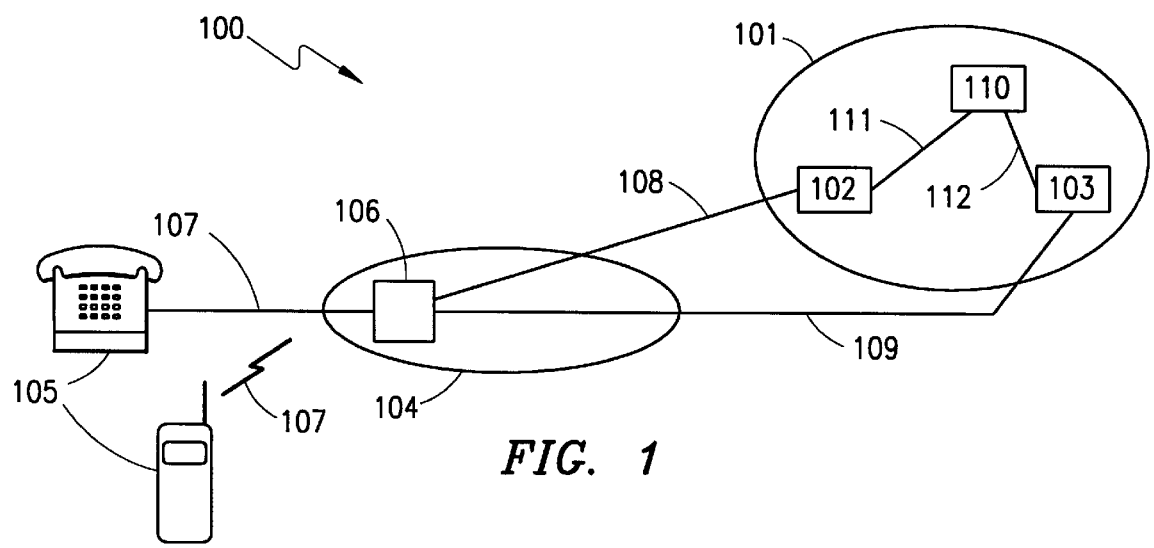
FIG. 1 is a diagram that illustrates an exemplary system and method for maintaining the reliability of a distributed network of service nodes, in accordance with a preferred embodiment of the present invention.
Figure 2:
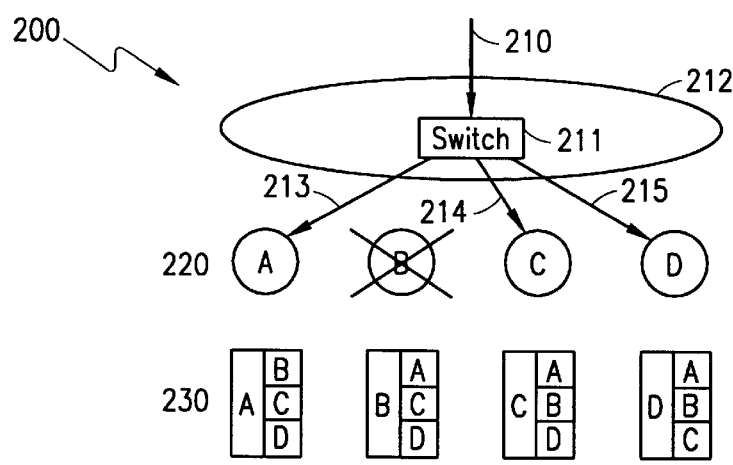
FIG. 2 is a diagram that illustrates a method for sharing the load of a faulty preferred server among a plurality of other servers, in accordance with the preferred embodiment of the present invention.

The preferred embodiment of the present invention and its advantages are best understood by referring to FIGS. 1–2 of the drawings, like numerals being used for like and corresponding parts of the various drawings.

FIG. 1 is a diagram that illustrates an exemplary system and method for maintaining the reliability and enhancing the security of a distributed network of service nodes, in accordance with a preferred embodiment of the present invention. System 100 includes a service network 101, which includes at least two service nodes 102 and 103, and a maintenance server 110 with signalling connection lines 111 and 112 to service nodes 102 and 103, respectively. Service nodes 102 and 103 are connected by communication lines 108 and 109, respectively, to a public switch 106 in a switched (e.g., wireless or wireline) network 104. A user of a fixed (or mobile) phone 105 can be connected to the public switch 106 through a first communications connection 107, and then to a service node 102 or 103 through respective communication line 108 or 109. Customers, such as user 105, subscribe to telecommunications services provided by the operators of service nodes 102 and 103. In return, these users receive a subscription number from the service provider to access the respective service node. Notably, although only two service nodes 102 and 103 are shown in service network 101, the present invention can include more than two such service nodes.

A call setup message from a user (105) requesting services from the service network 101 is routed through the public switch 106 by the subscription (access) number to a preferred one of the plurality of service nodes, which terminates or connects the call. In the preferred embodiment illustrated by FIG. 1, the user (105) is connected to public switch 106 through the first connection 107, and then to service node 102 through connection 108. In the event service node 102 does not reply to a call setup attempt, public switch 106 reroutes the call to the second (e.g., standby) service node 103, using known telecommunications network switching methods. Notably, as mentioned above, more than two such service nodes 102 or 103 can be included in a service network. As such, in the event service node 102 does not respond to a call setup attempt, the public switch can be directed dynamically to route the call to any available service node (or similar standby resource for providing services).

Each of the plurality of service nodes 102 and 103 has a respective list (stored in a memory location) of preferred subscription (access) numbers corresponding to names of subscribing users, and a second list (also stored in a memory location) of standby subscription (access) numbers corresponding to a rerouting that will occur when no response to a call setup request is received from the preferred server.

The maintenance server 110 stores (in a local memory location) permanent subscriber data about the services subscribed to by each user. Preferably, the maintenance server is not assigned to be a standby server (although it can be if desired). A task that the maintenance server 110 performs is to distribute the service logic required by the preferred service node 102 and standby node (e.g., 103). Another task that the maintenance server 110 performs is to update the standby server when a user's service profile has been modified in the preferred server. Consequently, in the preferred embodiment of the present invention, the plurality of service nodes (or similar resources for providing services) in the service network are capable of executing the same service logic, so a user can be served by anyone of the service nodes. As such, a fault that occurs in the preferred server 102 only affects those subscribers that are requesting services during that server's downtime. However, because of the availability of the standby server 103, those subscribers will not notice any disturbance. On the other hand, when a fault occurs, the subscribers connected to the faulty server can be adversely affected.

In operation, in response to the receipt of a rerouted call (e.g., due to a fault in preferred server 102), standby server 103 sends a signalling message to the maintenance server 110 that informs the maintenance server about the preferred server's problem. The maintenance server 110 then initiates actions to handle the situation. These actions can include assigning a new standby server from another one of the plurality of service nodes. Another such action is to detect when the faulty server 102 has been repaired or has otherwise recovered, by having the maintenance server 110 regularly check the operation of server 102 using signalling connection 111. Upon recovery of the preferred server 102, the maintenance server preferably updates server 102 with any modified user profiles stored in the interim by the standby server. Subsequent calls can be routed to the preferred server 102.

When new subscribers register for services from the service network 101, the maintenance server 110 can distribute the role of standby server over all the plurality of available service nodes in the service network. Consequently, if a preferred server experiences a fault, the additional load imposed on each of the other servers due to the loss of the faulty server, will be decreased because of the increase in the number of available servers to share the load.

FIG. 2 is a diagram that illustrates an exemplary method 200 for sharing the load of a faulty preferred server among a plurality of other servers (or similar resources that provide services), in accordance with the preferred embodiment of the present invention. Referring to FIGS. 1 and 2, an incoming call 210 (e.g., from user 105) is addressed (by an access number) to a faulty preferred service node B in a plurality of service nodes 220, A, B, C, D. The call is rerouted by public switch 211 dynamically to any available one of the standby service nodes A, C, D. Data records 230 are stored in each service node, which describe how to share the load from one server over the plurality of standby servers. For example, the data record for preferred service node B includes instructions for standby service nodes A, C and D to share service node B's load. Using that data, maintenance server 110 (FIG. 1) instructs switch 211 to reroute calls for preferred service node B to standby service nodes A, C and D (via respective connections 213, 214 and 215). As mentioned above, the maintenance server is preferably not assigned to be a standby server (but it can be if necessary. Additionally, in order to increase the reliability of the maintenance functions and security of the overall service network, duplicate processors can be used.

In summary, an important technical advantage of the present invention is that it overcomes the need for complex arrangements used to achieve high availability and security in an overlayed service network, by managing redundant computer capacity. This arrangement is simplified by utilizing the basic services being offered by the underlying network (e.g., rerouting calls in response to no answer). Additionally, an effect of this arrangement is that only those relatively few users who are utilizing advanced services at the time of a failure will be adversely affected. Consequently, the majority of users, who are not requesting services at the time of a server failure, will be left completely unaffected by the failure and no maintenance resources will have to be used in their regard.

As can be seen, another important technical advantage of the present invention is that the additional workload imposed on an individual standby server is minimized, because the total additional workload can be distributed dynamically over all of the available servers operating in the network.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for achieving operational reliability in a service network, comprising the steps of:

in response to a party using a subscriber number to make a call, a public telecommunications network routing said call to a preferred service resource, said preferred service resource providing at least one service in response to said call, and said preferred service resource comprising part of said service network; and if said preferred service resource does not respond to said call, said public telecommunications network rerouting said call to a standby service resource, said standby service resource providing said at least one service in response to said call, and said standby service resource comprising part of said service network.

2. The method according to claim 1, wherein said preferred service resource comprises a service node coupled to said public telecommunications network.

3. The method according to claim 1, wherein said standby service resource comprises a standby service node coupled to said public telecommunications network.

4. The method according to claim 1, further comprising the step of:

a reliable maintenance server distributing logic for said at least one service to said preferred service resource and said standby service resource.

5. The method according to claim 4, wherein in response to a detection of a changed user profile stored in at least one of said preferred service resource and said standby service resource, said reliable maintenance server storing said changed user profile such that a user profile stored in said at least one of said preferred service resource and said standby service resource can be replaced with said changed user profile.

6. An overlayed service network in conjunction with a second network, comprising:

a maintenance server, said maintenance server comprising part of said overlayed service network;

a plurality of service resources coupled to said maintenance server, said plurality of service resources comprising part of said overlayed service network; and a switch, responsive to a directive from said maintenance server, for routing a call to a first of said plurality of service resources, said switch comprising part of said second network, said first of said plurality of service resources providing at least one service in response to said call, and routing said call to a second of said plurality of service resources if said first of said plurality of service resources is unresponsive to said call, said second of said plurality of service resources providing said at least one service in response to said call.

7. The overlayed service network in conjunction with a second network according to claim 6, wherein said overlayed service network comprises a plurality of service nodes that overlay said second network, and wherein said second network comprises a mobile cellular communications network.

8. The overlayed service network in conjunction with a second network according to claim 6, wherein said first of said service resources comprises a preferred service node.

9. The overlayed service network in conjunction with a second network according to claim 6, wherein said second of said service resources comprises a standby service node.

10. The overlayed service network in conjunction with a second network according to claim 6, wherein said maintenance server comprises:

a reliable maintenance server for distributing logic for said at least one service to said first of said plurality of service resources and said second of said plurality of service resources.

11. The overlayed service network in conjunction with a second network according to claim 10, wherein in response to a detection of a changed user profile stored in at least one of said first of said plurality of service resources and said second of said plurality of service resources, said maintenance server storing said changed user profile such that a user profile stored in said at least one of said first plurality of service resources and said second of said plurality of service resources can be replaced with said changed user profile.

12. An overlayed service network in conjunction with a second network, comprising:

a maintenance server, said maintenance server comprising part of said overlayed service network;

a plurality of service resources coupled to said maintenance server, said plurality of service resources comprising part of said overlayed service network; and a switch, responsive to a directive from said maintenance server, for routing a call to a preferred service resource of said plurality of service resources, said switch comprising part of said second network, said preferred service resource of said plurality of service resources providing at least one service in response to said call, and routing said call to a standby service resource of said plurality of service resources if said preferred service resource of said plurality of service resources is unresponsive to said call, said standby service resource of said plurality of service resources providing said at least one service in response to said call.

13. An overlayed service network in conjunction with a second network, comprising:

a maintenance server, said maintenance server comprising part of said overlayed service network;

a plurality of service resources coupled to said maintenance server, said plurality of service resources comprising part of said overlayed service network, at least a first of said plurality of service resources being designated as a preferred service resource with respect to a first subscriber based, at least in part, on a first subscriber number and at least a second of said plurality of service resources being designated as a standby service resource with respect to said first subscriber; and a switch, responsive to a directive from said maintenance server, for routing a call to said preferred service resource of said plurality of service resources, said switch comprising part of said second network, said preferred service resource of said plurality of service resources providing at least one service in response to said call, and routing said call to said standby service resource of said plurality of service resources if said preferred service resource of said plurality of service resources is unresponsive to said call, said standby service resource of said plurality of service resources providing said at least one service in response to said call.

14. The overlayed service network in conjunction with a second network according to claim 13, wherein said first of said plurality of service resources is also designated as a standby service resource with respect to a second subscriber.

15. The overlayed service network in conjunction with a second network according to claim 13, wherein the designations are provided in at least one electronically-accessible data record at each of said plurality of service resources, said at least one electronically-accessible data record being accessible by said maintenance server.

16. A method for achieving reliability for an overlayed network of resources associated with a telecommunications network, comprising the steps of:
routing, by said telecommunications network, a call to a first resource of said overlayed network of resources based, at least in part, on a first number that is associated with said first resource;
re-routing, by said telecommunications network, said call to a second resource of said overlayed network of resources when said first resource is non-responsive to said call; and
notifying, by said second resource, a maintenance resource of said overlayed network of resources of the nonresponsiveness of said first resource based, at least in part, on said first number.

17. The method according to claim 16, further comprising the step of:
distributing, by said maintenance resource, a workload corresponding to said first resource to at least one other resource of said overlayed network of resources.

18. The method according to claim 16, further comprising the step of:
monitoring, by said maintenance resource, said first resource to determine when said first resource is operational.

19. The method according to claim 16, wherein said steps of routing and re-routing are performed substantially within said telecommunications network and said step of notifying is performed substantially within said overlayed network of resources.

20. A network of resource nodes having reliability procedures that operate in conjunction with an associated telecommunications network, comprising:
a first resource node, said first resource node corresponding to a first and a second plurality of numbers such that a call associated with a first number of said first plurality of numbers is directed to said first resource node by said telecommunications network;
a plurality of second resource nodes, at least a second resource node of said plurality of second resource nodes having access to at least a portion of said second plurality of numbers, said at least a second resource node capable of receiving said call as re-directed by said telecommunications network when said first resource node is unresponsive to said call and determining that a second number associated with the re-directed call is part of said second plurality of numbers;
a maintenance resource node in communication with said first resource node, said at least a second resource node, and said telecommunications network; and
wherein said at least a second resource node is further capable of communicating to said maintenance resource node that said first resource node is unresponsive when said at least a second resource node determines that said second number associated with the re-directed call is part of said second plurality of numbers.

21. The network of resource nodes according to claim 20, wherein said first number associated with said call comprises a subscription access number.

22. The network of resource nodes according to claim 20, wherein said first resource node comprises a preferred service node.

23. The network of resource nodes according to claim 20, wherein:
said at least a second resource node of said plurality of second resource nodes comprises a plurality of said plurality of second resource nodes; and
said maintenance resource node is capable of (i) distributing said second plurality of numbers to said plurality of said plurality of second resource nodes such that each of said plurality of said plurality of second resource nodes receives and stores at least one of said second plurality of numbers, (ii) causing to be established in each of said plurality of said plurality of second resource nodes a correspondence between the stored at least one of said second plurality of numbers and said first resource node, and (iii) commanding said telecommunications network to establish re-directing information such that another call directed to any one of said first resource node or said plurality of said plurality of second resource nodes is re-directed to another one of said first resource node or said plurality of second resource nodes if said any one is unresponsive.

24. The network of resource nodes according to claim 23, wherein said another one includes said at least a second resource node, and said at least a second resource node comprises a standby service node with respect to said first resource node.

25. The network of resource nodes according to claim 20, wherein said maintenance resource node comprises a reliable maintenance server, said reliable maintenance server capable of providing a user profile update to said first resource node and said plurality of second resource nodes.

26. A method for sharing maintenance actions between two networks, comprising the steps of:
providing a telecommunications network and an overlayed network of resources, said overlayed network of resources comprising a plurality of service nodes that operate independently of said telecommunications network;
directing, by said telecommunications network, a call to a first service node of said plurality of service nodes based, at least in part, on a number;
detecting, by said telecommunications network, a lack of response from said first service node with respect to said call;
re-directing, by said telecommunications network responsive to the detected lack of response from said first service node, said call to a second service node of said plurality of service nodes based, at least in part, on said number; and
determining, by said overlayed network of resources, that said number is one of a plurality of numbers for which said first service node is a primary service node and said second service node is a standby service node.

27. The method according to claim 26, wherein:

said step of detecting comprises the step of detecting, by said telecommunications network, a signal indicative that said first service node does not answer said call; and said step of re-directing comprises the step of re-routing, by said telecommunications network after receiving said signal indicative of no answer, said call to said second service node in accordance with at least one data record of said first service node based, at least in part, on said number.

28. The method according to claim 26, wherein said plurality of service nodes operate independently of said telecommunications network but rely on signaling and transport services from said telecommunications network for interconnecting said plurality of service nodes.

29. The method according to claim 26, wherein said telecommunications network comprises a wireless cellular communications network, and said overlayed network of resources comprises an Intelligent network (IN).

30. The method according to claim 26, wherein said step of determining comprises the step of determining by said second service node; and further comprising the step of:

notifying, by said second service node, another node in said overlayed network of resources that said first node appears to be malfunctioning.

31. The method according to claim 26, further comprising the steps of:

checking, by a maintenance node, whether said first service node has returned to functional operation; and if so, updating said first service node with any modifications to user profiles that were made while said first service node was nonfunctional.

32. A network of resource nodes having reliability procedures that operate in conjunction with an associated telecommunications network, comprising:

a first resource node, said first resource node corresponding to a first plurality of numbers such that a call associated with a first number of said first plurality of numbers is directed to said first resource node by said telecommunications network;

a plurality of second resource nodes, at least a second resource node of said plurality of second resource nodes corresponding to a second plurality of numbers and having access to at least a portion of said first plurality of numbers, said at least a second resource node capable of receiving said call as re-directed by said telecommunications network when said first resource node is unresponsive to said call and determining that said first number associated with the re-directed call is part of said at least a portion of said first plurality of numbers;

a maintenance resource node in communication with said first resource node, said at least a second resource node, and said telecommunications network; and wherein said at least a second resource node is further capable of communicating to said maintenance resource node that said first resource node is unresponsive when said at least a second resource node determines that said first number associated with the re-directed call is part of said at least a portion of said first plurality of numbers.

33. The network of resource nodes according to claim 32, wherein said first number associated with said call comprises a subscription access number.

34. The network of resource nodes according to claim 32, wherein said first resource node comprises a preferred service node.

35. The network of resource nodes according to claim 32, wherein:

said at least a second resource node of said plurality of second resource nodes comprises a plurality of said plurality of second resource nodes; and said maintenance resource node is capable of (i) distributing said first plurality of numbers to said plurality of said plurality of second resource nodes such that each of said plurality of said plurality of second resource nodes receives and stores at least one of said first plurality of numbers, (ii) causing to be established in each of said plurality of said plurality of second resource nodes a correspondence between the stored at least one of said first plurality of numbers and said first resource node, and (iii) commanding said telecommunications network to establish re-directing information such that another call directed to any one of said first resource node or said plurality of said plurality of second resource nodes is re-directed to another one of said first resource node or said plurality of second resource nodes if said any one is unresponsive.

36. The network of resource nodes according to claim 35, wherein said another one includes said at least a second resource node, and said at least a second resource node comprises a standby service node with respect to said first resource node relevant to said at least a portion of said first plurality of numbers.

37. The network of resource nodes according to claim 32, wherein said maintenance resource node comprises a reliable maintenance server, said reliable maintenance server capable of providing a user profile update to said first resource node and said plurality of second resource nodes.

* * * * *